(12) United States Patent
Falcon

(10) Patent No.: US 8,359,610 B2
(45) Date of Patent: Jan. 22, 2013

(54) AUDIENCE MEASUREMENT APPARATUS, SYSTEM AND METHOD FOR PRODUCING AUDIENCE INFORMATION OF A MEDIA PRESENTATION

(75) Inventor: Fernando Diego Falcon, Milan (IT)

(73) Assignee: The Nielsen Company (US), LLC, Schaumburg, IL (US)

( * ) Notice: Subject to any disclaimer, the term of this patent is extended or adjusted under 35 U.S.C. 154(b) by 930 days.

(21) Appl. No.: 11/955,520

(22) Filed: Dec. 13, 2007

(65) Prior Publication Data

US 2008/0155583 A1 Jun. 26, 2008

(30) Foreign Application Priority Data

Dec. 14, 2006 (GB) .................................. 0624942.9

(51) Int. Cl.
*H04H 60/33* (2008.01)
(52) U.S. Cl. ................. 725/13; 725/9; 725/11; 348/734
(58) Field of Classification Search ................ 725/9–16; 348/734
See application file for complete search history.

(56) References Cited

U.S. PATENT DOCUMENTS

| | | | |
|---|---|---|---|
| 5,228,077 A * | 7/1993 | Darbee | 379/102.01 |
| 5,235,414 A | 8/1993 | Cohen | |
| 6,477,508 B1 | 11/2002 | Lazar et al. | |
| 6,647,548 B1 | 11/2003 | Lu et al. | |
| 7,647,605 B2 | 1/2010 | Lu et al. | |
| 7,712,114 B2 | 5/2010 | Ramaswamy | |
| 7,739,705 B2 | 6/2010 | Lee et al. | |
| 7,793,316 B2 | 9/2010 | Mears et al. | |
| 2002/0032904 A1 * | 3/2002 | Lerner | 725/14 |
| 2004/0058675 A1 | 3/2004 | Lu et al. | |
| 2004/0064319 A1 * | 4/2004 | Neuhauser et al. | 704/273 |
| 2005/0144632 A1 | 6/2005 | Mears et al. | |
| 2005/0186953 A1 * | 8/2005 | Harris | 455/419 |
| 2007/0209047 A1 * | 9/2007 | Hallberg et al. | 725/9 |
| 2010/0083299 A1 | 4/2010 | Nelson et al. | |

FOREIGN PATENT DOCUMENTS

| | | |
|---|---|---|
| CA | 2211963 | 1/1999 |
| EP | 1026847 | 8/2000 |
| WO | 9111062 | 7/1991 |
| WO | 0022824 | 4/2000 |
| WO | 2005007957 | 9/2005 |

(Continued)

OTHER PUBLICATIONS

Les Taylor; "Guest Viewing; Why and how it is collected and how it contributes to Total Viewing;" TV & Radio Audience Research; 2 pages; http://www.tns-global.com.

(Continued)

*Primary Examiner* — Nicholas Corbo
(74) *Attorney, Agent, or Firm* — Hanley, Flight & Zimmerman, LLC

(57) ABSTRACT

Audience measurement methods and systems for producing audience information of a media presentation. At least one embodiment includes a moveable apparatus comprising an audio capturing means for picking up audio from a media presentation distributed to an audience through at least one media rendering device to produce an audio signal, processing means for processing the audio signal to derive the content identification information, user interface means for entering the presence information of panel members, memory means to store the content identification information and the presence information, and communication means for transmitting the content identification information and the presence information for further processing to generate audience information.

39 Claims, 7 Drawing Sheets

FOREIGN PATENT DOCUMENTS

WO          2006099612          9/2006

OTHER PUBLICATIONS

European Patent Office, Summons to attend oral proceedings pursuant to Rule 115(1) EPC, issued on Jan. 26, 2012, for application No. 07870455.8, 4 pages.

International Search Report issued in connection with International Application No. PCT/IB2007/004426, mailed Nov. 13, 2008, 5 pages.

European Patent Office, Communication pursuant to Article 94(3) EPC, issued on Jan. 12, 2010, for application No. 07870455.8, 3 pages.

International Preliminary Report on Patentability issued in connection with International Application No. PCT/IB2007/004426, mailed Jun. 16, 2009, 7 pages.

Written Opinion of the International Searching Authority issued in connection with International Application No. PCT/IB2007/004426, mailed Nov. 13, 2008, 6 pages.

* cited by examiner

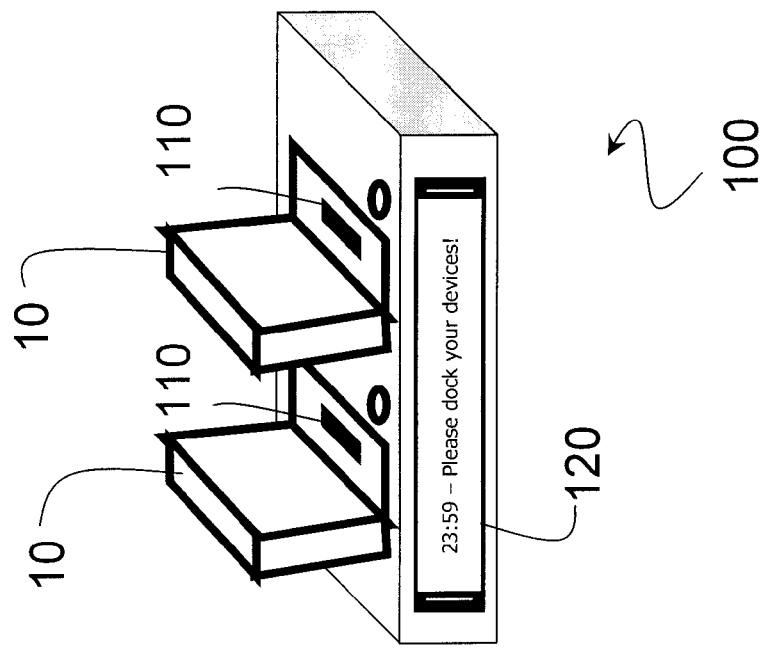
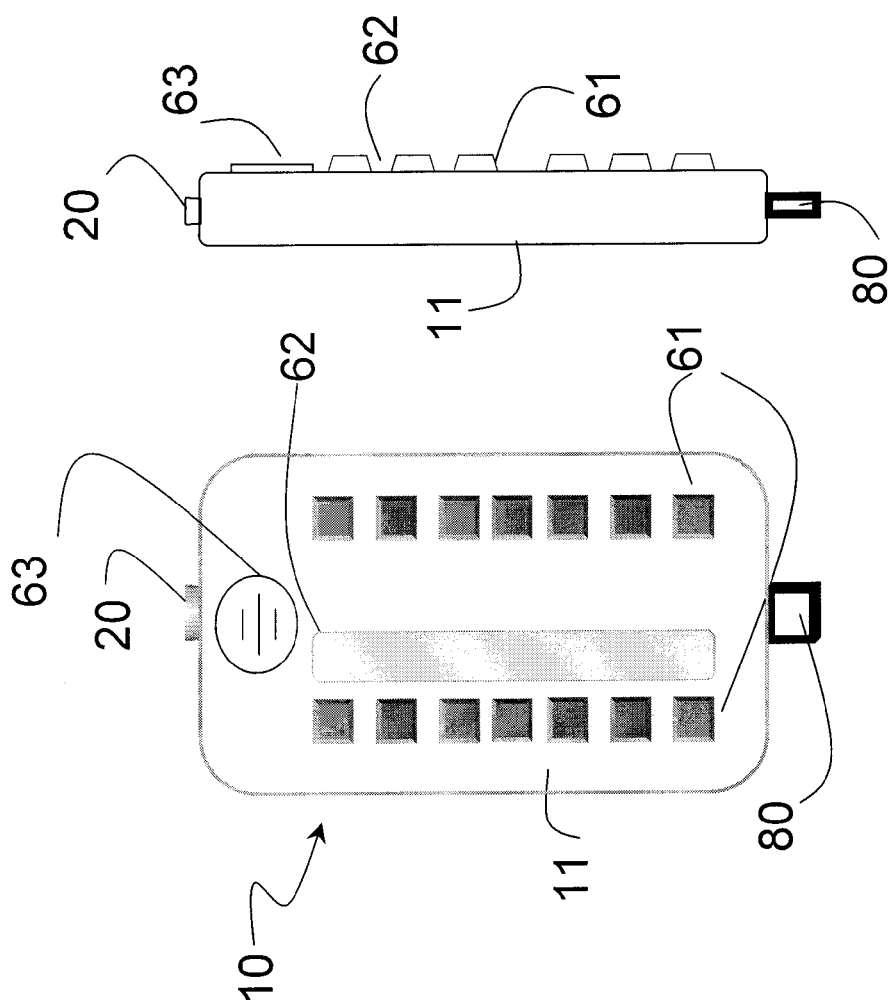
Fig. 4a
Fig. 4b
Fig. 5

AUDIENCE MEASUREMENT APPARATUS, SYSTEM AND METHOD FOR PRODUCING AUDIENCE INFORMATION OF A MEDIA PRESENTATION

This patent claims Paris Convention filing priority from GB Patent Application No. 0624942.9, filed Dec. 14, 2006, and entitled, "Audience Measurement Apparatus, System and Method for Producing Audience Information of a Media Presentation".

DESCRIPTION OF THE RELATED ART

Apparatuses for measuring the audience of a media presentation, such as a television or a radio program, are well-known in the industry. Knowledge of the size and composition of audiences to television or radio broadcast associated to certain environments, for example a home, is of paramount importance for the whole broadcast industry in order to rate the advertising space included in broadcasts.

Furthermore, knowledge of the demographical composition of the viewing audience is critical for advertisers to optimize the effectiveness of their commercial messages by targeting the right groups for their products.

In order to collect such information, usually a plurality of media consumers is enlisted for cooperating in an audience measurement survey for a predefined length of time.

The group of viewers cooperating in the survey is called a "panel", while each viewer participating in the panel is called a "panel member". Audience metering apparatuses are then associated to the media rendering devices or display systems used by panel members for watching television broadcasts (hereinafter "media devices") at their respective viewing locations. Such metering apparatuses have two main goals: a) determining the content being shown on their associated media devices; and, b) registering the presence of one or more panel members so that the exposure to the content determined by the metering apparatuses can be accounted to produce audience data.

Audience metering apparatuses have traditionally been in the form of a set-top box placed on the media device (traditionally a TV set). In FIG. 1 an example is given of a typical set-top box 510, operating as a metering apparatus that is wire connected to a TV set 520 under measurement for identification of the content being displayed there. An example of an audience metering system currently being used in many countries is given by the UNITAM system. The UNITAM system comprises a set-top box like metering device which includes several ports that allow the connection to various media devices associated to the TV set under measurement. The metering device is capable of detecting the port from which the signal on screen is being generated and derives audio signatures continuously from that said port as long as it remains active. The signatures generated by the metering device are later transmitted by modem to a remotely located central base, where they are processed in order to identify all content shown on the associated TV set.

In the case of the above-mentioned UNITAM metering system, this function is achieved by means of a content identification technology comprising a set of techniques and methods that can recognize an unknown segment of audio material among a plurality of reference segments generated from known audio streams. Audio, received directly from the TV set, for example as an audio signal via the wire connection, is converted into "signatures" that characterize the audio material being analyzed. A pattern correlation engine is then used to identify an unknown piece of content by scanning its signatures against a large set of previously-generated reference signatures. The content on display is then determined by analyzing correlation values according to appropriate algorithms in order to provide a wide range of media measurement and monitoring services, of which the most widely used is "Broadcast Identification" (i.e. recognizing a channel being watched on a TV set). Other well known techniques used by set-top box metering devices to collect viewing data include detecting a content identification audio code or an audio watermark inserted in the audio stream of the media presentation.

The combination of the data generated by a set-top box meter and its associated remote control (concept known as "people meter system") offers accurate and complete information about the viewing session in a cost-effective way. In this respect, an essential characteristic of this kind of audience metering apparatuses is that viewers identify themselves by declaring their presence in front of the TV set 520, usually by pressing an identification key on a remote control 530 that is able to communicate with a decoder/receiver module 515 in the set-top box 510 to produce presence information. A graphic display 516 is used to communicate different types of messages to the panel members, the most important one being the acknowledgement that the declaration procedure has been successfully completed.

An example of a remote control 530 currently being used by AGB Nielsen Media Research in their television audience measurement ("TAM") system is called "push-button people meter" measurement, or "active people meter" measurement and is detailed in FIG. 2a. A typical user interface of a TAM people meter's remote control includes: a) keys associated to panel members, b) keys associated to eventual guests, and c) keys to input other type of information that indicates a relevant attribute of a viewing session (hereinafter "session attribute information"). An essential issue for the accuracy of TAM system is that a different key is univocally assigned to each panel member in order to facilitate the declaration process as much as possible. A second feature that critically contributes to the accuracy of the TAM system is that the remote control does not perform other functions unrelated to audience measurement, so that it is always available to register any change in the viewing session (i.e., people joining or leaving a viewing session, etc.). A third fundamental characteristic that notably influences the accuracy of the measurements is given by the layout of the keys and the ergonomics of the remote control, which have a significant impact in compliance levels.

In the example shown in FIG. 2a, the remote control 530 includes a plurality of keys distributed on a layout comprising a first members' area 531, and a second guests' area 533. The first members' area 531 is positioned in the lower portion of the remote control 530, so that the keys identified by alphabetical letters are easily accessed by the thumb of the hand holding the remote control, allowing the panel members to promptly declare their presence by depressing their respective keys. Such members' keys are associated to the panel members during the setup of the system in the home. A 'cast' key 532 is provided for showing on a display of the set-top box 510 (see FIG. 1) the names of panel members and their respective associated keys in the member area 531. In the example, the second guests' area 533 is positioned in the upper portion of the remote control 530, and the keys identified by numbers are used to declare the number of guests and their age. Two 'gender' keys 534 and 535 are used to specify the gender of the guests. A further 'Enter key' 537 is intended for confirming storage of the guest data, while a 'Show/Esc' key 536 is a service key for performing different supplementary actions, such as alternate display of panel members and guests list, or deletion of wrong data concerning guests. Using this type of remote control guest entry, requires pressing four keys: one of the two gender keys, two number keys for the age (the range is 00-99) and the 'Enter' key.

In the example of FIG. 2a, in the central portion of the remote control 530 there is a 'Holiday' key 539 used to indicate that the panel family will be away from home for a certain period, and a 'Baby' key 538 used to indicate that the TV is being watched only by children below the minimum age required to be considered a panel member.

Another example of a set-top box people meter's remote control is given in FIG. 2b, which shows a remote control 540 used by the Broadcasters' Audience Research Board (BARB) in the United Kingdom. In this case, a first members' area 541 is located at the left of the remote control's user interface, and each member key is associated to a label indicating the panel member's name. A second guests' area 543 is located on the right of the user interface, and the presence of guests is declared through two keys: one of both gender keys 544 and 545, and the key corresponding to the age range to which the guest belongs. When compared to the example given in FIG. 2a, the guest entry procedure in this remote control is achieved in a faster and easier way (i.e., pressing two keys instead of four). In 1999, the introduction into the United Kingdom of a new meter handset designed with the purpose of providing a simplified guest entry procedure and the facility to enter up to 99 simultaneous guest viewers produced "both an increase in the number of households registering guest viewers and an increase in the level of guest viewing reported" (quoted from "Guest Viewing. Why and how it is collected and how it contributes to Total Viewing", document available at www.tns-global.com).

As can be seen from the examples shown in FIGS. 2a and 2b, the layout and the functions of the keys in the people meter's remote control are extremely important for the task of measuring audiences, since the homogeneity (or heterogeneity) of the declaration interface may have an impact on the overall measurements results. The cooperation of the panel, given the above-mentioned considerations, is a critical factor since from a methodological perspective there is no viewing unless panel members declare their presence. In the case of a typical set-top box meter 510 (see FIG. 1), a key element that contributes to the effectiveness of the panel member's presence declaration procedure is the graphic display 516 included in the set-top box meter. One major function of the display is to provide feedback to the panel member about their status (i.e. present or absent). A second fundamental purpose of the display is to request the panel member to perform different tasks associated with the viewing session in some specific cases. For example, if the meter detects that the TV set is on, but no panel member has declared his/her presence, the graphic display can show a message asking who is present, reminding the panel member to start the viewer declaration procedure if he/she is actually present. In the same way, if no activity is detected on the part of the panel members after a certain amount of time, the display may show a message asking to confirm the presence of any panel member.

As already stated, a set-top box meter with an associated remote control has proved to be a very effective solution for measuring television audiences. However, in recent years technology has evolved in a dramatic way, offering new ways to be exposed to various types of media. For example, computers are being increasingly used for watching TV and listening radio inside homes through Internet, in many cases using a Wi-Fi link, which gives users the ability to do so in different places within their homes or in their vicinity. In addition, the increasingly lower prices of conventional TV sets have increased the penetration of these devices within households, many times being installed or used in unusual locations. Furthermore, technology nowadays provides different versions of portable multimedia players, where programs can be downloaded for rendition in a mobile location, like for example the well-known ipod from Apple Computers. In this new scenario, a set-top box audience metering apparatus designed to be installed by being attached to a TV set under measurement may not be appropriate or applicable at all because it may be cumbersome and inconvenient.

Moreover, given that the set-top boxes used for metering usually need to be wired to all of the signal sources associated to the TV set, such a type of audience metering apparatus is often not compatible with the use of 'LCD' or 'plasma' flat-screen TV sets which are usually installed attached to a wall, since there is not enough room or suitable place to install the metering apparatus, or the installation would be aesthetically annoying for panel members.

Recently, there has been development in the field of personal meters. A personal meter is usually a device that can be worn by a user and is equipped with a microphone capable of capturing the ambient sound to which the user is being exposed, so that it can potentially identify the audio track of a broadcast program through an appropriate broadcast identification technique.

An example of a personal meter is the "Portable People Meter" or "PPM" currently offered by Arbitron Inc. in the United States and other countries. In a panel using a personal audience meter, each panel member has to be equipped with his/her own device, which has to be worn by panel members in order to capture any content to which they may be exposed during the entire day. The personal audience meters are sometimes perceived as an attractive solution because of the fact that they do not require installation and are therefore able, in principle, to capture mobile viewing situations (provided that users agree to carry the device with them during most of the day).

However, several drawbacks with personal devices have been noticed in the last few years as a result of personal devices being tested in different situations. One example is given by the tests conducted on various personal meters by the Radio Joint Audience Research (RAJAR) in the United Kingdom during 2004, which were made public in February 2005. The results of the tests cast some doubts about the accuracy of the audience data generated by the use of such personal devices. Among the drawbacks, one of the most apparent is that personal meters are burdensome for panel members, since they have to be worn during the whole time members are awake (i.e. from dawn till they go to sleep at night). This inevitably induces a negative attitude among panel members that tends to reduce cooperation, and therefore reduce viewing levels, whilst at the same time increasing drop-out rates (i.e., panel members terminating their cooperation agreements), all of which has a significant impact on operating costs and data quality.

Another important drawback of personal meters is that, in order to determine exposure to content being shown on TV devices, personal meters rely on the proximity of the person wearing the meter to those devices. This implies a drastic change in the definition of "viewing", since it overrides the direct concept of voluntary user declaration, replacing it with an indirect method based on recognition of certain specific content by an electronic device. It has not been proved that such a method accurately reflects when a panel member is in a viewing situation, since the method is heavily dependent on a number of variables, whilst only some of the variables are related to spatial proximity. For example, the physical posture of the person at any given time may be critical to the device's capability of recognizing the content being shown on the TV device, since it could alter the acoustic path between a TV device's speaker and the meter's microphone, sometimes attenuating the sound level arriving at the personal meter, thereby making content recognition impossible.

Moreover, the recognition effectiveness of a personal meter can be influenced by several possible disturbances which may be affected by environmental variables, potentially modifying the overall audience values. For example, an acoustic phenomenon like reverberation can significantly alter a personal meter's performance (in terms of content recognition), since it tends to scramble the original signal with unwanted copies of it, carrying various delays with respect to each other. Since reverberation levels are heavily dependent on weather conditions (e.g. temperature, pressure, humidity, etc.), all of these variables can potentially alter the average audience levels obtained by these devices.

Given the above-mentioned inconveniences, personal people meters can only really be considered a solution suitable for measurement of out-of-home viewing, where there are currently no technical or economically feasible alternatives. However, in view of the above-mentioned inconveniences, personal people meters are not appropriate for measuring in-home viewing situations, which require more rigorous measuring methods in order to achieve higher levels of accuracy.

There is, therefore, a need for an audience measurement system that is capable of producing audience information of a media presentation distributed through a plurality of media rendering devices located at different places within a home environment and that is not burdened by the mentioned limitations of fixed people meters or personal people meters.

BRIEF DESCRIPTION OF THE DRAWINGS

Embodiments will now be described, by way of example only, by referring to the enclosed drawings, wherein:

FIGS. 4a and 4b are two views of the apparatus according to embodiments;

FIG. 5 is a perspective view of a complementary module for the apparatus according to embodiments;

DETAILED DESCRIPTION

Embodiments relate to audience measurement apparatuses, systems and methods used for measuring the audience of a media presentation, for example measuring audiences of programs broadcast by television and radio which are watched, or listened to, by means of different types of media apparatuses available at a household. Embodiments are applicable to all systems suitable for offering media presentations similar to those described in what follows.

Figure 3:
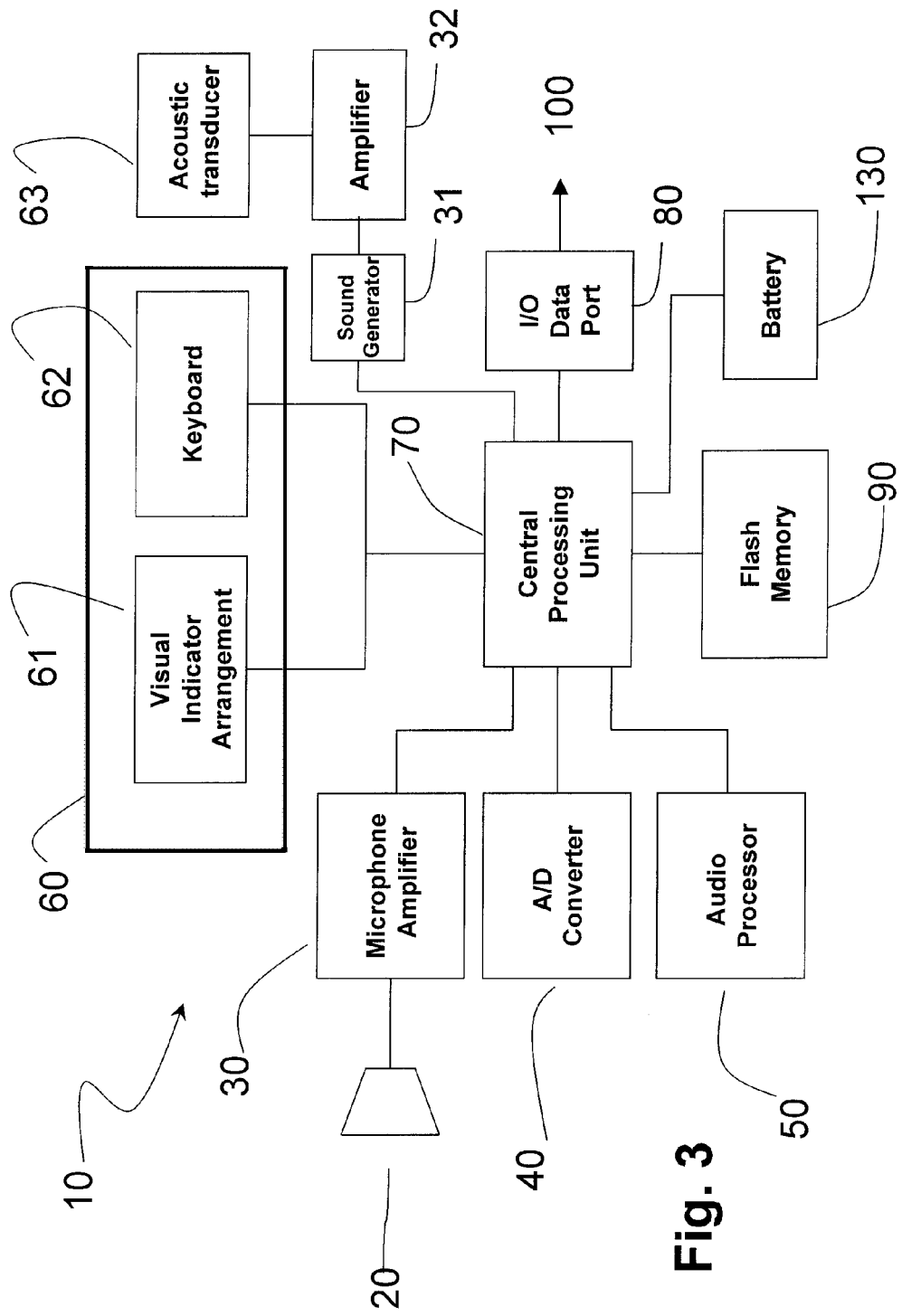
FIG. 3 is a block diagram of an apparatus according to embodiments.

FIG. 3 shows a block diagram of an apparatus for measuring audience of a media presentation according to embodiments, indicated as a whole by reference number 10.

Such apparatus 10 includes, represented by a block identified by reference number 20, a microphone suitable for detecting the audio portion of a media presentation. Such a microphone 20 is connected in cascade to a microphone amplifier 30 and to a subsequent analog-to-digital converter 40 that carries out a digitalization of the audio part of the media presentation prior an audio processing block 50. Such an audio processing block 50 derives content identification information from the sample of audio recording captured by the microphone 20. Such content identification information, associated with corresponding time stamps, is stored and further transmitted to a remote processing location to contribute in the production of audience information. The content identification technology to be used could be, for example, the one currently used by the UNITAM people meter mentioned above, among other approaches available for the measurement of television and radio audiences. The content identification information is then supplied to a Central Processing Unit 70 that is equipped with a Flash Memory 90 for storing it together with other related data like the presence information as declared by panel members. The Central Processing Unit is equipped also with an input/output data port 80. The apparatus exchanges the viewing data with a host device 100 that is shown in FIG. 5. In a preferred embodiment, host device 100 has the shape of a docking station for one or more of the apparatus 100. The connection may be implemented through a USB (Universal Serial Bus) connector when the apparatus is docked, or by means of any suitable wireless data link, such as, but not limited to, infrared, Bluetooth, Wi-Fi, etc.

The apparatus 10 is included in a housing 11 having the shape and size of a palmar device, that can be moved around within different locations in a home environment (i.e. the device is shaped and dimensioned so as to be portable), or, if the case, also in other outdoor areas within the home. The apparatus 10 is powered by means of a battery 130.

The apparatus 10 includes also a User Interface 60 that comprises a keyboard 62 and a visual indicator arrangement 61.

Such keyboard 62 and visual indicator arrangement 61 can be better observed in FIG. 4a, where a schematic front view of the apparatus 10 is shown.

The keyboard 62 is readily accessible to the panel member for declaring his/her presence in front of the media rendering device being measured, and the visual indicator arrangement 61 provides signalling means to feedback information about the presence of the members.

Figure 1:
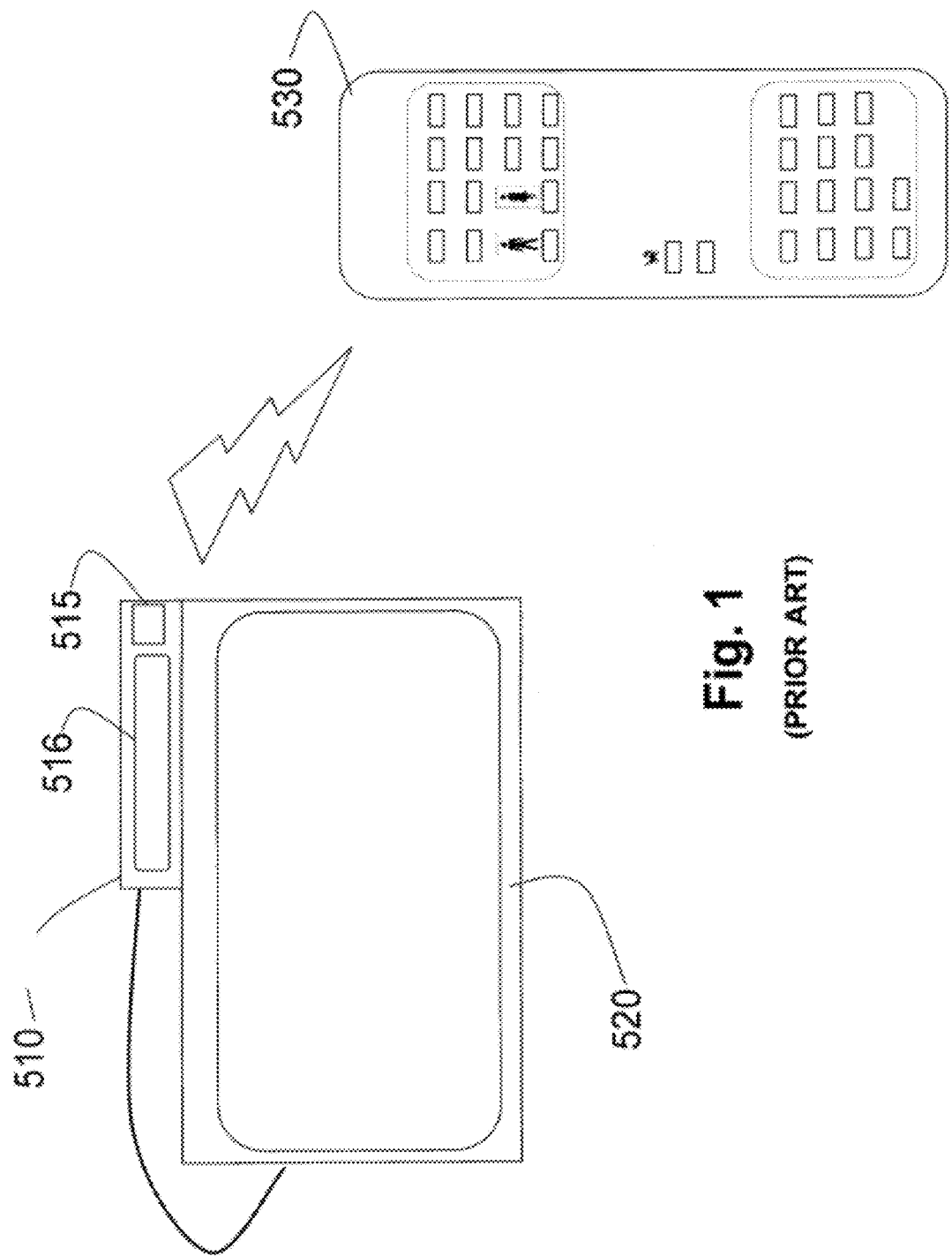
FIG. 1 is a diagram of a set-top box metering device according to the prior art.
Figure 2A:
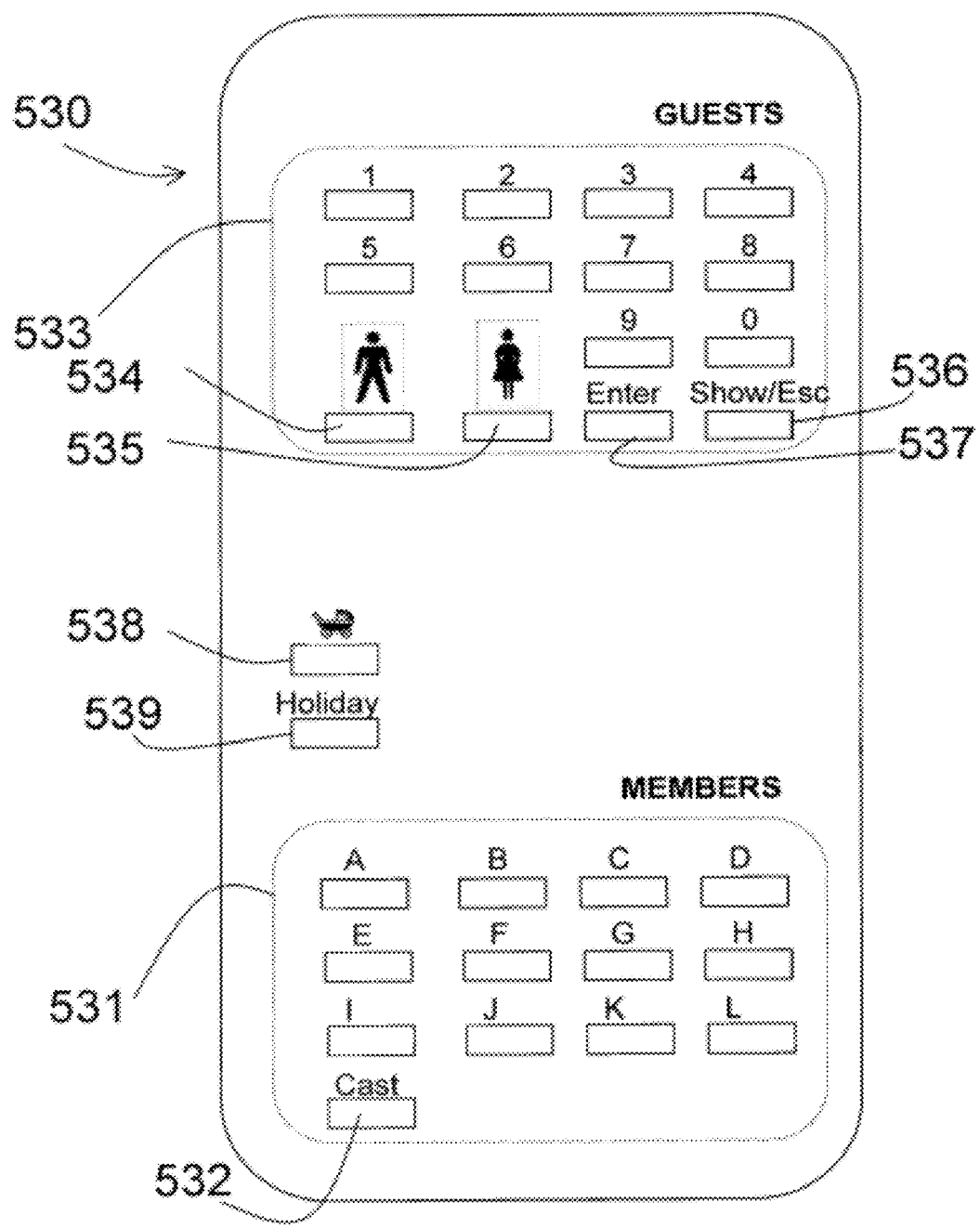
FIGS. 2a and 2b are diagrams of remote controls currently used with the set-top box meter of FIG. 1.
Figure 2B:
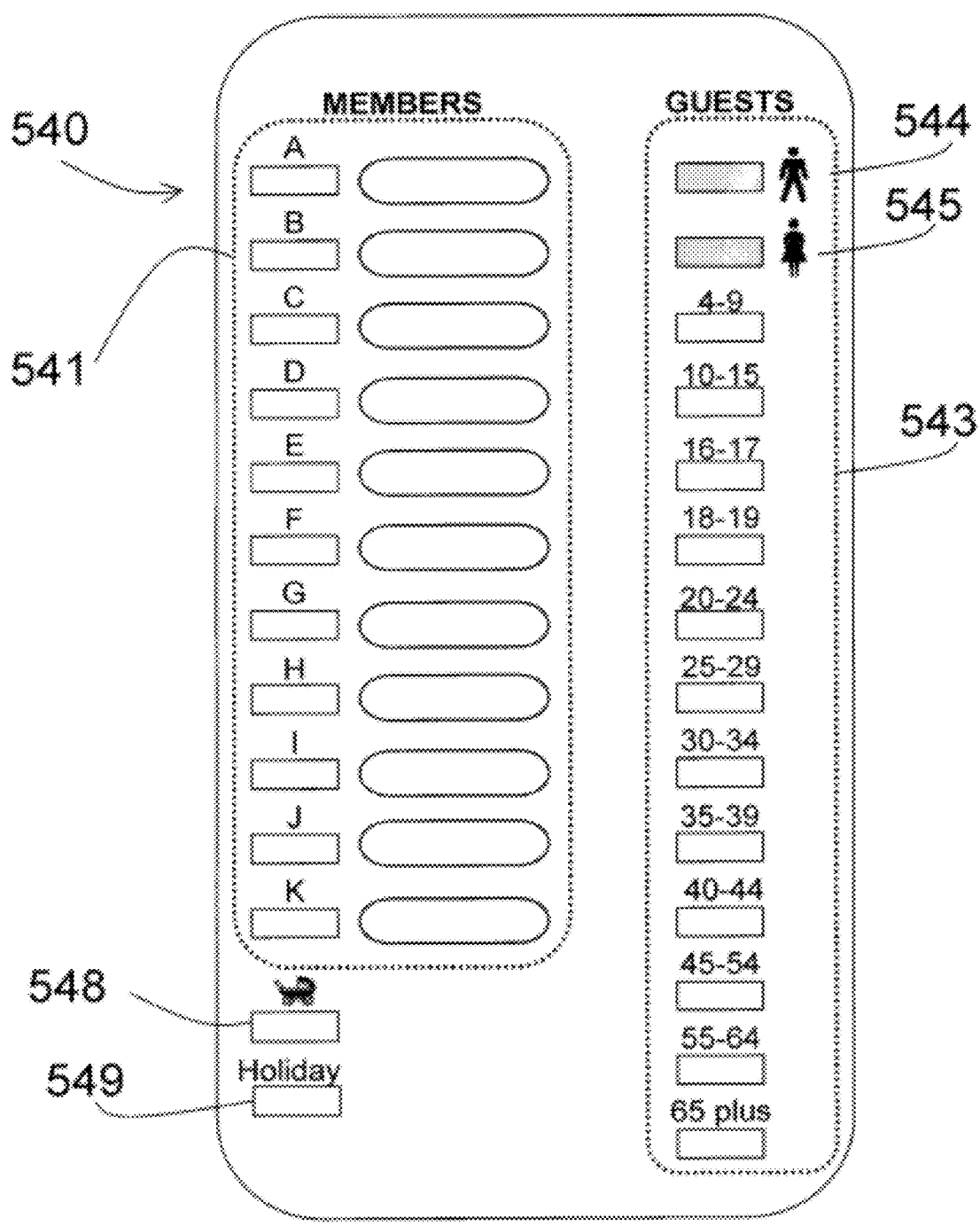

It must be noted that although for clarity purposes the keyboard 62 is represented in FIG. 4a in a very simplified manner, as well as the housing 11, such housing and the layout of the keys corresponds substantially to the housing and the layout functionality of the prior art remote controls 530 and 540 shown with reference to FIGS. 1, 2a and 2b. In this way, the advantage given by the homogeneity among the different remote controls is exploited based on panel cooperation hypotheses strongly dependent on such layout.

According to an enhanced embodiment, the apparatus 10 further includes a sound generator 31 connected to an amplifier 32 which drives an acoustic transducer 63. The sound generator 31 may include any suitable circuitry to produce an electronic audio signal while amplifier 32 may include any suitable circuitry capable of driving acoustic transducer 63. In a preferred embodiment, sound generator 31 includes A/D converter means to produce said audio signal through digital processing. Acoustic transducer 63 may include an electromagnetic speaker, piezoelectric membrane, or any other suitable transducer technology capable of converting a low-frequency electronic signal into vibration of a mass.

As explained above, the audio stimulus produced by acoustic transducer 63 may be used to prompt or remind the panel member, by means of specifically designed audio messages or sounds, to perform certain tasks associated with their participation in the survey.

The apparatus 10 for measuring audience of a media presentation operates as follows.

Panel members are instructed to undock and place the moveable apparatus 10 in the proximity of the measured media rendering device (TV set, radio set, PC, portable multimedia player or others) and, as it is the case for the prior set-top box metering systems, panel members are required to declare their presence through keyboard 61. The apparatus 10 through the microphone 20 picks up the audio part of the media content being rendered by the measured device and derives content identification information out of it through blocks 30, 40, and 50, storing it in the memory 90 for later downloading to the host device 100, shown in FIG. 5.

In a preferred embodiment, such host device 100 includes a plurality of slots 110 in which the apparatuses 10 can be inserted and connected through connectors compatible with the USB connector to circuitry suitable for forwarding the information stored in memory 90 to a remotely located central processing base. Such a circuitry, not shown in FIG. 3, may include a radio transmitter or alternatively utilise a link through an available communication network, either wired or wireless. A message display 120 is also provided on the host device 100 in order to alert the panel members to perform the required tasks, for instance by visualizing a message like "23:59—Please dock your devices!". Panel members are indeed instructed to place their moveable apparatus 10 in the host device 100 every night before going to sleep (or 2 AM, whichever comes first) for downloading of the stored information and for recharging of the battery 130. The acoustic transducer 63 may complement or replace the display 120 in reminding panel members about this requirement by generating an audio message which is played to the panel member through the acoustic transducer 63.

Figure 6:
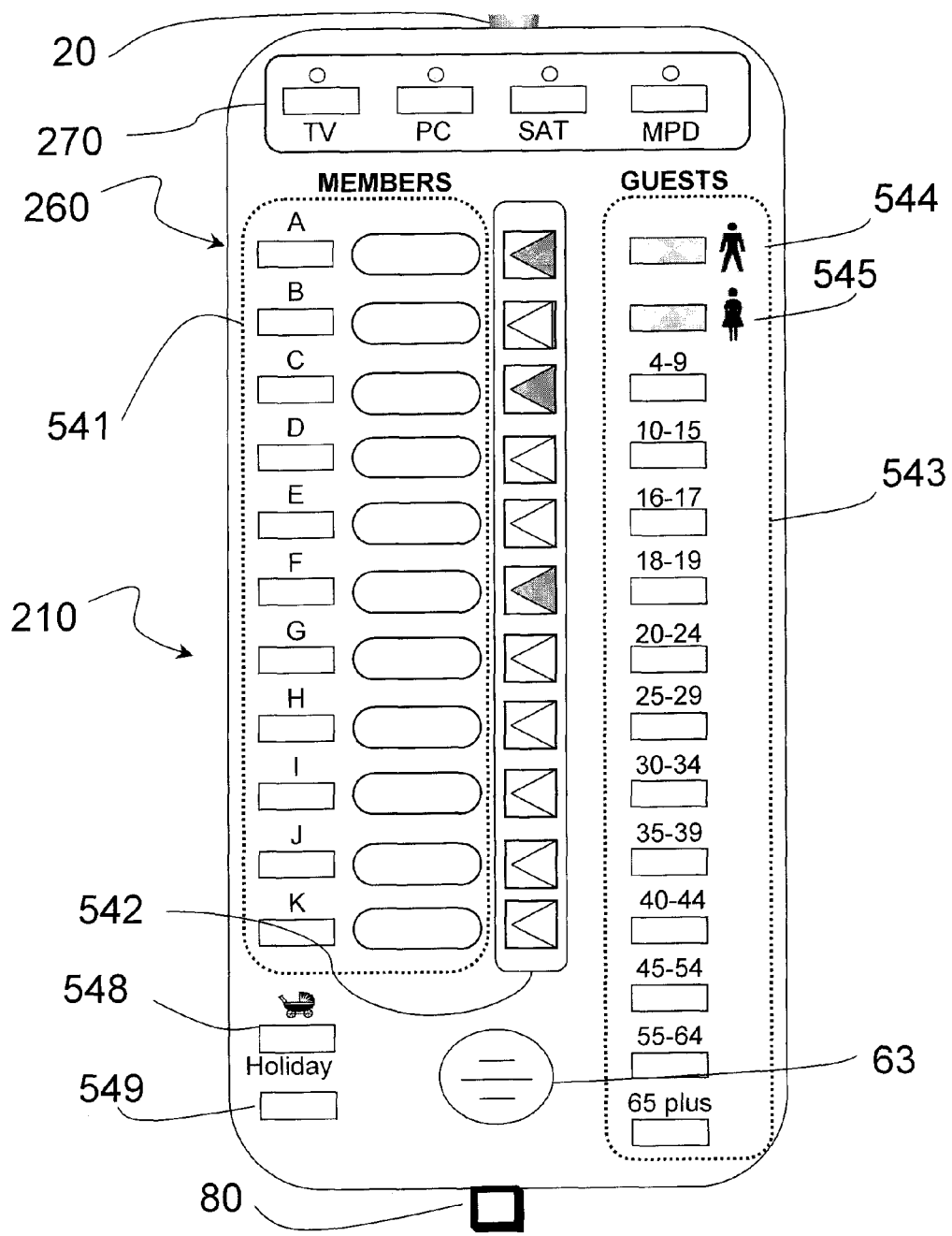
FIG. 6 is a diagram of one embodiment of the apparatus according to embodiments.

One embodiment of an apparatus is shown in FIG. 6, indicated as a whole by the reference 210.

Such apparatus 210 includes same or analogous modules with respect to that previously indicated in the block diagram of FIG. 3, including a User Interface 260 comprising a layout of keys analogous to that of the remote control 540 shown in FIG. 2b. Therefore, the apparatus 210 includes the panel members' area 541, the guests' area 543, the 'Holiday' key 539 and the 'Baby' key 538, already described above. The apparatus 210 comprises a visual indication arrangement 542 including Liquid Cristal Displays (LCDs) which fits in the keyboard layout and is used to provide feedback to the panel members, clearly indicating what panel members are present at the viewing session. In an alternative embodiment, the apparatus 210 provides feedback to the panel members by means of light emitting diodes (LEDs) that signal through an on/off status indication the presence/absence of the corresponding panel member.

The User Interface 261 includes a further keys area: a session attribute area 270 that comprises a plurality of keys for entering session related information, as for example declaring the type of media rendering device under measurement. The session attribute area 270 shown in the embodiment of FIG. 6 includes a key for declaring an audience in front of a TV set (indicated as "TV" in FIG. 6), a key for declaring audience in front of a personal computer (indicated as "PC" in FIG. 6), a key for declaring audience in front of programs which are broadcast via satellite (indicated as "SAT" in FIG. 6) and a key for declaring audience in front of a portable multimedia player device (indicated as "PMP" in FIG. 6) such as an Ipod.

The addition of the session attribute area 270 allows panel members to declare additional important information that regards the media device being viewed or listened, with a minimal change in the User Interface of the system. Furthermore, the session attribute area 270 enhances the portability of the apparatus 210, increasing the number of media rendering devices that can be measured through it. The number of keys of the session attribute area 270 is not restricted to four so that it may vary according to the amount of different media presentation devices to be measured, and the feedback to the panel member may be provided through any type of visual indication items, such as LEDs, LCDs, back-lit keys, amongst others.

In the embodiment shown in FIG. 6, the visual indicator arrangement 542 shows that panel members associated with keys A, C and F are present in a PC media session. Such a function of indicating who is present in front of a specific media rendering device was already present in conventional set-top box metering apparatuses, and it is advantageously transferred to the moveable apparatus 210.

The acoustic transducer 63 is used to alert the panel member about the need to perform essential cooperation tasks. In one embodiment, a library of synthesized voice messages is stored in Flash Memory 90, and an appropriate message is played back to the panel member through central processing unit 70, sound generator 31, amplifier 32 and acoustic transducer means 63 (see FIG. 3). For example, the apparatus could play a voice message meaning "Please, dock me" in a local language when a certain low battery threshold is detected or when a panel member declares the end of a viewing session. Yet another advantageous use of acoustic transducer 63 is to play back a voice message to thank panel members when they complete successfully a certain task, for example, after declaring their presence or after successfully docking apparatus 10 into host device 100.

The apparatus 210 further includes a microphone 20, visible in FIG. 6, plus the microphone amplifier 30, the analog-to-digital converter 40 and the audio processing block 50, not shown there. The apparatus 210 includes also a Central Processing Unit 70, a Flash Memory 90, a sound generator 31, an amplifier 32 and a battery 130 (not shown in the figure), while the input/output data port 80 is visible in the lower portion of the apparatus 210. In an alternative embodiment, an audio input port may be added to the apparatus so that an audio signal may be fed to the apparatus 210 by means of a direct connection to an audio output port of the media rendering device under measurement.

Figure 7:
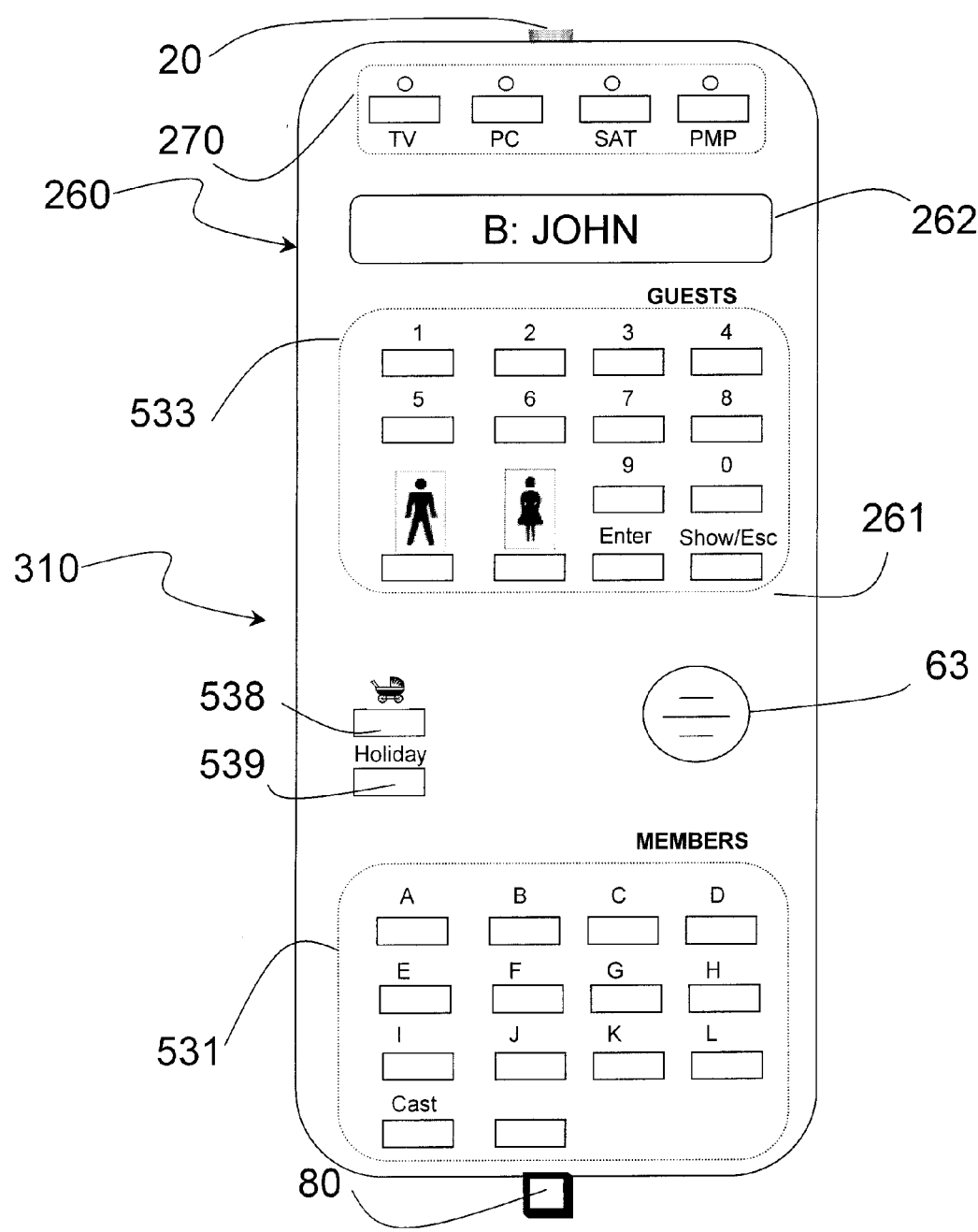
FIG. 7 is a diagram of an alternative embodiment of the apparatus according to embodiments.

Another embodiment of the apparatus is shown in FIG. 7. Such apparatus 310 includes analogous modules with respect to that previously indicated in the block diagram of FIG. 3, including a User Interface 260 comprising a layout of keys analogous to that of the remote control 530 shown in FIG. 2a. Therefore, the apparatus 210 includes the members' area 531, the guests' area 533, the 'Holiday' key 539 and the 'Baby' key 538, already described above. The apparatus 310 comprises a visual indicator arrangement including a graphic display 262 that fits in the layout of the keys, used to provide feedback to the panel members, clearly indicating if their presence has been registered. What regards such graphic display 262, it must be noted that preferably such display substantially replicates the images and messages usually displayed by set-top box meters, requiring therefore a minimal adaptation effort by panel members already cooperating in a survey. In the example shown in FIG. 6, the display 262 shows that key "B" in the members' area 531 corresponds to the panel member named "JOHN". Such a function, as explained, is already present in some set-top box metering devices, and it is advantageously transferred to the apparatus 210.

The User Interface 261 also includes a session attribute area 270 that comprises a plurality of keys devoted to the declaration of the audience rendering device under measurement, each of them associated to a visual indication of its corresponding on/off status.

The apparatus 310 includes an acoustic transducer 63 and a microphone 20, visible in FIG. 6, plus a microphone amplifier 30, an analog-to-digital converter 40 and an audio processing block 50, not shown there. The apparatus 310 includes as well a Central Processing Unit 70, a Flash Memory 90, a sound generator 31, an amplifier 32 and a battery 130 (not shown), while input/output data port 80 is visible in the lower portion of the apparatus 310.

Thus, embodiments of an audience measurement system for producing audience information of a media presentation include a moveable apparatus that picks up an audio signal belonging to the media presentation, and processes the audio signal in order to derive content identification information. Embodiments of the apparatus comprise a user interface that enables panel members to indicate their presence in front of a media presenting device and to indicate the media session type, providing feedback to panel members about the presence information and the selected media session type. The content identification information, presence information and the media session type are stored and may then be downloaded to, for example, a docking station which sends the data to a remotely located central base for further processing for generating audience information.

It is a main object of embodiments to provide an audience measurement system for producing audience information of media presentations (mainly television and audio broadcasting, but not only) that can cover exposure to content that happens inside a home using one or more metering devices that can be moved to different locations within a home (i.e. metering devices that are not fixed).

It is still another object of embodiments to provide an apparatus and method having the features set forth above, that requires minimum setup effort, if any, while still providing more accurate data than a personal meter.

It is still another object of embodiments to provide an apparatus and method having the features set forth above, that does not significantly increase the burden imposed to panel members (in terms of cooperation).

It is still another object of embodiments to provide an apparatus and method able to measure audience in association with different media rendering devices (as, for example, television sets, radio sets, personal computers, portable multimedia players, amongst the most usual) in different locations within a home environment.

It is another object of embodiments to provide an apparatus and method having the features set forth above and whose measuring accuracy does not depend on the body posture of the panel member and is not critically affected by the environmental conditions.

It is still another object of embodiments to provide an apparatus and method having the features set forth above that substantially preserves the accepted definition of "viewing" within the industry, so that it has the capability of producing audience data that can be seamlessly combined with data produced by set-top box metering systems.

A preferred embodiment comprises a moveable apparatus having substantially the shape, size and keyboard layout of a typical remote control used in a conventional set-top box people meter, said moveable apparatus further including an arrangement of visual indicators for realizing essential user interface features of conventional set-top box people meters, plus an audio pickup and suitable electronic processing means for content identification. In a system embodiment, the apparatus is complemented with a docking station where said apparatus can be docked periodically for the purpose of recharging a battery and for downloading data that has been captured by the apparatus during the measurement process and subsequently transferring the data to a remotely located processing centre for producing audience information.

An audience measurement system comprising embodiments of the apparatus is capable of realizing the objects set forth above providing several advantages with respect to prior art systems.

Because it does not need to be connected to the measured media rendering device, embodiments are capable of capturing viewing through moveable media rendering devices used within an environment as well as media rendering devices otherwise not measurable by fixed meters, yet providing substantially the same type of audience information currently obtained from fixed people meter systems. Since the presence of panel members is registered by declaration in the same way as conventional people meters, there is no change in the definition of viewing from a methodological standpoint, which is of paramount importance in order to maximize the compatibility of the viewing data produced by system embodiments with that of existing audience measurement systems currently in use in dozens of panels around the world.

One advantage of embodiments is that, by being an apparatus which is moveable but which is not required to be worn by panel members, it implies no substantial change in the level of cooperation from panel members to realize the survey having regard to today's set-top box meters.

System embodiments are more efficient than systems based on personal devices when measuring audiences in closed environments, since the apparatus can be shared among several panel members as opposed to requiring one separate device for each one of them. Furthermore, the audio reception of embodiments can be expected to be more accurate than that of personal devices, since the apparatus is intended to be placed in proximity of the measured media rendering device, which makes the audio reception less prone to disturbance from noise and acoustic distortions, whilst at the same time being completely independent of the position of the viewer or listener.

It must be also noticed that, contrary to personal meter solutions that tend to burden panel members by requiring them to wear the device during the whole day, the system embodiments do not imply any substantial change in the way panel members are ought to cooperate with the survey, except for the additional requirement of docking the moveable apparatus with a certain periodicity.

Moreover, since apparatus embodiments are dedicated devices (i.e., embodiments are not intended to perform other functions beyond those related to audience measurement), it eliminates the possibility (and therefore any potential associated interference) of panel members executing alternative functions that could interrupt or distort the audience measurement process.

In an enhanced embodiment of the apparatus of the system, said keyboard further includes an additional set of keys for entering additional information about a viewing session being measured through it (i.e., session attribute information).

In a preferred embodiment of the apparatus, said additional set of keys are used to specify what type of media rendering device is being measured so that a single apparatus can be used to measure a plurality of media rendering devices within a given environment, providing a clear benefit in terms of efficiency.

Yet another preferred embodiment of the apparatus comprises acoustic transducer means capable of producing a stimulus in an audio domain to alert panel members at certain times when their cooperation is required. The acoustic transducer means may be used as well to complement the user interface with audio indicators that feedback panel members after certain tasks have been completed.

Without prejudice to the underlying principles of invention, the details and embodiments may vary significantly, with respect to what has been described and shown by way of example only, without departing from the scope of the invention as defined by the annexed claims.

It will be apparent to those skilled in the art that the term media presentations as used in the context of this document can represent television or radio programs broadcast via a variety of communication means, including cable networks, satellite networks, Internet, fiber optic cables, etc., as well as other types of suitable means to transmit audio and video programs to potential consumers.

The invention claimed is:

1. A portable apparatus for capturing content identification information and presence information related to one or more panel members, comprising:
   an audio capturing device to receive an audio signal of a media presentation distributed to an audience via a media presentation device;
   a processor to process the audio signal to extract the content identification information;
   a user interface to receive the presence information related to the one or more panel members via a plurality of member keys and to receive status information identifying a type of the media presentation device generating the audio signal via one of a plurality of device keys, each of the device keys corresponding to a respective type of media presentation device; and
   a memory to store the content identification information, the status information identifying the type of media presentation device generating the received audio signal, and the presence information.

2. The apparatus of claim 1, wherein the user interface comprises:
   a keyboard including the device keys; and
   one or more feedback outputs for providing feedback to the panel members related to the presence information.

3. The apparatus of claim 2, wherein the keyboard comprises the member keys.

4. The apparatus of claim 2, wherein the keyboard comprises a set of guest keys.

5. The apparatus of claim 2, wherein the keyboard comprises one or more keys for entering gender information.

6. The apparatus of claim 2, wherein the keyboard comprises one or more keys for entering age information.

7. The apparatus of claim 2, wherein the one or more feedback outputs comprise a visual indicator arrangement.

8. The apparatus of claim 7, wherein the visual indicator arrangement is to display a plurality of visible items, wherein each one of the visible items is assigned to a respective panel member.

9. The apparatus of claim 7, wherein the visual indicator arrangement comprises a plurality of light emitting devices.

10. The apparatus of claim 7, wherein the visual indicator arrangement comprises a graphic display.

11. The apparatus of claim 1, wherein the audio capturing device comprises a microphone.

12. The apparatus of claim 1, further comprising a communication device comprising a data port for exchanging data with a host device.

13. The apparatus of claim 12, wherein the communication device comprises a wireless data link for exchanging data with the host device.

14. The apparatus of claim 1, further comprising a palmar device to house the apparatus.

15. The apparatus of claim 1, further comprising a battery.

16. The apparatus of claim 2, wherein the one or more feedback outputs comprise an acoustic transducer to generate an audible stimulus.

17. The apparatus of claim 16, wherein the audible stimulus comprises a voice message.

18. The apparatus of claim 1, wherein the media presentation is a television program.

19. The apparatus of claim 1, wherein the media presentation is a radio program.

20. An audience measurement system, the system comprising:
   a portable apparatus to capture content identification information and presence information related to one or more panel members, the portable apparatus comprising:
      an audio capturing device to receive an audio signal of a media presentation distributed via one or more media presentation devices;
      a processor to process the audio signal to derive the content identification information; and
      a user interface to receive the presence information related to the one or more panel members via a plurality of member keys and to receive status information indicating a type of media presentation device generating the audio signal via one of a plurality of device keys, each of the device keys corresponding to a respective type of media presentation device; and
   a communication device to transmit the content identification information, the status information indicating the type of media presentation device generating the received audio signal, and the presence information to a central processor.

21. The system of claim 20, further comprising a host device to receive the portable apparatus.

22. The system of claim 21, wherein the host device further comprises a charger to charge a battery of the portable apparatus.

23. The system of claim 21, wherein the host device is a docking station.

24. The system of claim 20, wherein the media presentation is a television program.

25. The system of claim 20, wherein the media presentation is a radio program.

26. A method for capturing content identification information and presence information related to one or more panel members, the method comprising:
   placing a portable device in proximity to a media presentation device;
   processing a received audio signal with a processor of the portable device to extract content identification information;
   capturing presence information input by the one or more panel members via respective ones of a plurality of member keys;

receiving an indication of a type of media presentation device generating the audio signal via respective ones of a plurality of device keys, each of the device keys selectable to indicate respective types of media presentation devices; and storing the content identification information, the indication of the type of media presentation device generating the received audio signal, and the presence information in a memory.

27. The method of claim 26, further comprising providing feedback related to the presence information to the one or more panel members.

28. The method of claim 27, wherein providing the feedback comprises providing the feedback via an arrangement of visual indicators located on in the portable apparatus.

29. The method of claim 27, wherein providing feedback comprises providing the feedback via a graphic display.

30. The method of claim 26, wherein capturing the presence information comprises capturing the presence information via a keyboard located on the portable apparatus.

31. The method of claim 30, wherein the keyboard includes a respective key for each of the one or more panel members of a household.

32. The method of claim 26, wherein processing the audio signal comprises extracting signatures from the audio signal.

33. The method of claim 26, wherein processing the audio signal comprises extracting identification codes the audio signal.

34. The method of claim 27, wherein providing the feedback comprises generating an audible stimulus.

35. The method of claim 34, wherein the audible stimulus comprises a recorded voice message.

36. A tangible machine readable memory or storage disk having instructions stored thereon that, when executed, cause a handheld device to at least:
  process an audio signal of a media presentation to extract content identification information;
  detect selection of a first key to capture presence information identifying the presence of a panel member;
  detect selection of a second key to receive an indication of a type of media presentation device generating the audio signal, the second key being one of a plurality of keys designating respective types of media presentation devices; and
  store the content identification information, the indication of the type of media presentation device generating the audio signal, and the presence information.

37. The apparatus of claim 1, wherein the user interface comprises:
  a keyboard including the device keys; and
  one or more feedback outputs for providing feedback to the panel members related to the status information identifying the type of media presentation device generating the received audio signal.

38. The apparatus of claim 7, wherein the visual indicator arrangement is to display a plurality of visible items, wherein each one of the visible items is assigned to a respective type of media presentation device.

39. The method of claim 26, further comprising providing feedback related to the indication of the type of media presentation device generating the audio signal.

* * * * *